May 8, 1923. 1,454,723
W. T. BURTIS
FILTER BED FOR SEWAGE DISPOSAL
Filed Aug. 7, 1922
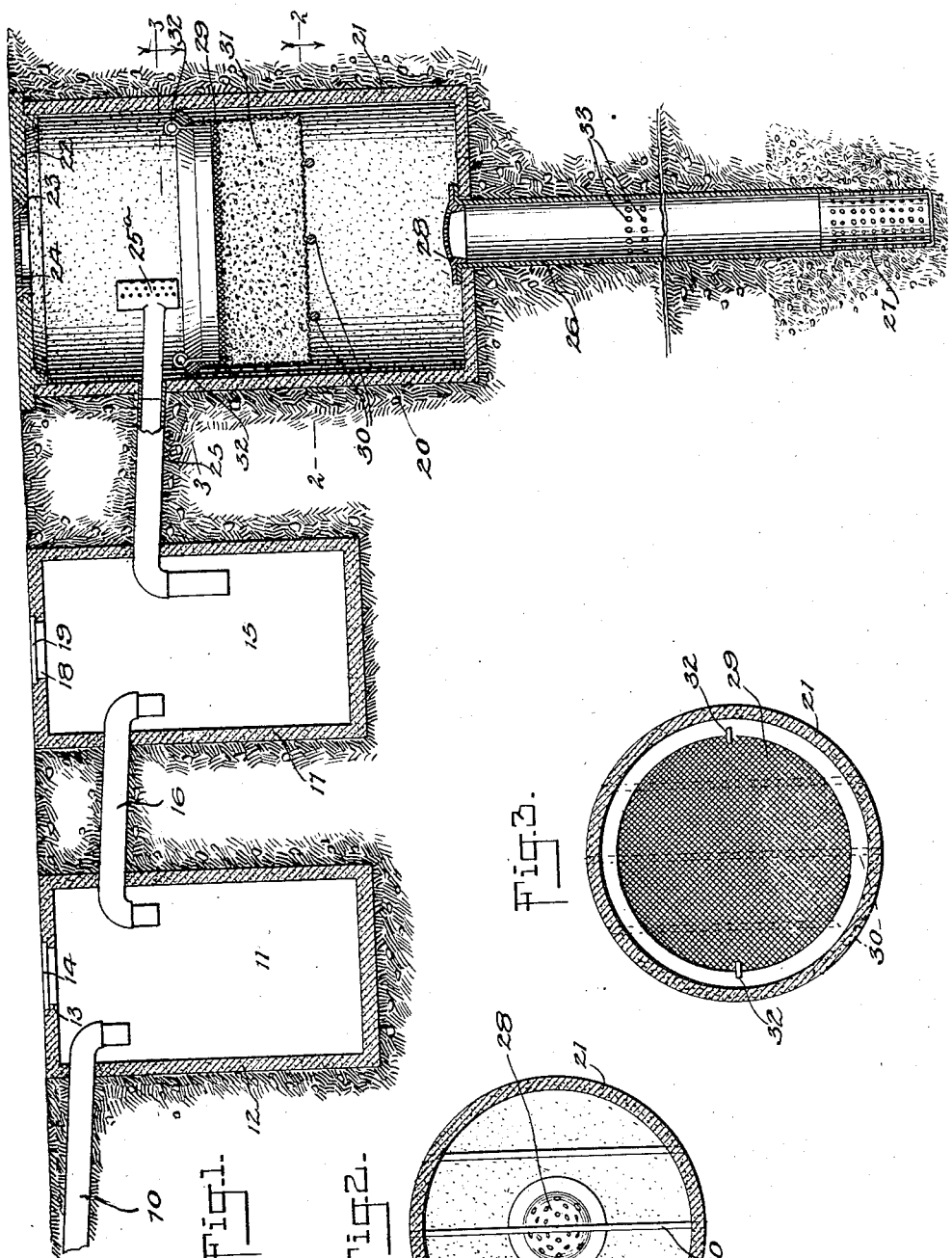
WITNESSES
INVENTOR
William T. Burtis
BY
ATTORNEYS Patented May 8, 1923.

1,454,723

UNITED STATES PATENT OFFICE.

WILLIAM THOMAS BURTIS, OF GLEN HEAD, NEW YORK.

FILTER BED FOR SEWAGE DISPOSAL.

Application filed August 7, 1922. Serial No. 580,159.

*To all whom it may concern:*

Be it known that I, WILLIAM T. BURTIS, a citizen of the United States, and a resident of Glen Head, in the county of Nassau and State of New York, have invented a new and Improved Filter Bed for Sewage Disposal, of which the following is a full, clear, and exact description.

This invention has relation to sewerage or waste disposal systems and has particular reference to the filter for the final disposal of the waste water or residue of cesspools.

Heretofore it has been the common practice where cesspools have been used, to convey the waste water or residue therefrom into a field of laterals which often become clogged and necessitate the digging up of a large area of the field to effect the removal of the stoppage and insure the proper seepage of the waste into the ground.

It is, therefore, an object of the present invention to provide a filter bed for the final disposal of waste water after the grease and other solid substances have been intercepted in the cesspools, which filter bed positively insures the return of the waste water into the ground in a highly purified state.

As a further object the invention contemplates a filter bed for the final disposal of the waste water from sewerage systems or cesspools, which filter bed is of an extremely simple construction, inexpensive to construct and which affords means by which it may be periodically cleansed.

The invention further contemplates a filter bed for the final disposal of waste water from sewerage systems, which insures the discharge of the same into the ground at a point where it will positively be absorbed and this without the necessity of going to the expense of a large amount of excavation work.

With the above recited and other objects in view, the invention resides in the novel construction set forth in the following specification, particularly pointed out in the appended claims and illustrated in the accompanying drawing, it being understood that the right is reserved to embodiments other than those actually illustrated herein to the full extent indicated by the general meaning of the terms in which the claims are expressed.

In the drawing—

Figure 1 is a sectional view of a sewerage or waste disposal system including a filter bed constructed in accordance with the invention.

Fig. 2 is a horizontal sectional view through the filter bed taken approximately on the line 2—2 of Fig. 1.

Fig. 3 is a similar sectional view taken approximately on the line 3—3 of Fig. 1.

Referring to the drawing by characters of reference, 10 designates an outlet conduit from a house, which conduit terminates and empties into a grease trap 11 which consists of a cement receptacle 12 sunk into the ground and provided with a manhole or clean-out 13, normally closed by a cover 14. A cesspool 15 receives the residue from the grease trap through a conduit 16 which establishes communication therebetween and said cesspool consists of a cement receptacle 17 which is built into the ground, provided with a manhole 18 normally closed by a cover 19. The filter bed which constitutes the invention is designated generally by the character 20 and the same comprises a cementitious receptacle 21 which is built into the ground, provided with an upper open end normally closed by a top 22 having a central manhole opening 23 which is closed by a removable cover 24. A conduit 25 provided with a sprinkler head 25$^a$ at its outlet end establishes communication between the cesspool 15 and the interior of the filter bed. From the lower end or bottom of the receptacle 21, a pipe 26 of appreciably lesser diameter than the receptacle extends downwardly into the ground or soil and the lower open end thereof has connected thereto and is closed by a reticulated cap 27 which may be of a mesh construction or a perforated thimble. The upper end of the pipe 26 extends through and into the bottom end of the receptacle 21 to permit of the gravitational outlet of the contents therefrom. The upper open end of the pipe is preferably closed by a strainer cap 28. Within the receptacle 21 a filter basket 29 is supported on transverse rods 30 to dispose its upper end slightly below the conduit 25. The basket is filled with layers of sand and gravel to effect the initial filtering of the discharged waste water received through the conduit 25 from the cesspool and grease trap. The basket is provided with handles 32 which serve as means for effecting its removal from the receptacle 21 and the renewal of the contents of the basket periodically. When it becomes necessary to remove and renew the contents of the basket the top 22 is displaced permitting of the insertion of the proper means for engagement with the handles to effect its withdrawal from the receptacle.

In use and operation, the waste or sewerage is primarily emptied into the grease trap 11 through the conduit 10 where the grease is intercepted and removed prior to the discharge of the residue through the conduit 16 into the cesspool 15. At this point the solid substances rise to the top while the waste water remaining is siphoned off by the conduit 25 and conveyed to the filter bed 20. The waste water received by the filter bed is initially filtered through the layers of gravel and sand in the basket, thence through the strainer 28 into the pipe 26, at which point it has attained a high degree of purity. The pipe 26 which requires only a small amount of excavation for its installation extends down through the soil strata until its lower end enters the gravel and sand layers, at which point the water is discharged through the cap or thimble 27. If during the installation of the pipe 26 sand or gravel layers are encountered, the pipe may be perforated as at 33 to permit of the discharge of a portion of the water at various levels.

I claim:

1. A system of sewerage disposal comprising in combination with a conduit having means interposed therein for intercepting and removing the solid or semi-solid substances, a filter bed having an intake at its upper end communicating with the outlet end of said conduit, said filter bed comprising a cylindrical body having a closed lower end, a downwardly extending outlet pipe in said lower end embeded in the ground, a filtering element interposed between the filter bed intake and outlet, said filtering element being removable through the upper open end of the filter bed, and a closure normally closing the upper end thereof.

2. A system of subterranean sewerage disposal comprising in combination, a conduit having trapping chambers interposed therein constituting means for intercepting and removing the solid or semi-solid matter from the sewerage, a filter bed comprising a cylindrical body having a closed lower end, a downwardly extending outlet pipe in said lower end, an intake at its upper end communicating with the outlet end of the conduit, a filtering element consisting of a foraminous basket filled with sand and gravel interposed between the inlet and outlet, said filtering element being removable through the upper open end of the filter bed, and a closure normally closing said upper open end.

WM. THOMAS BURTIS.